April 5, 1932.　　　R. F. PEO　　　1,852,755
SHOCK ABSORBER
Filed March 7, 1930　　3 Sheets-Sheet 2
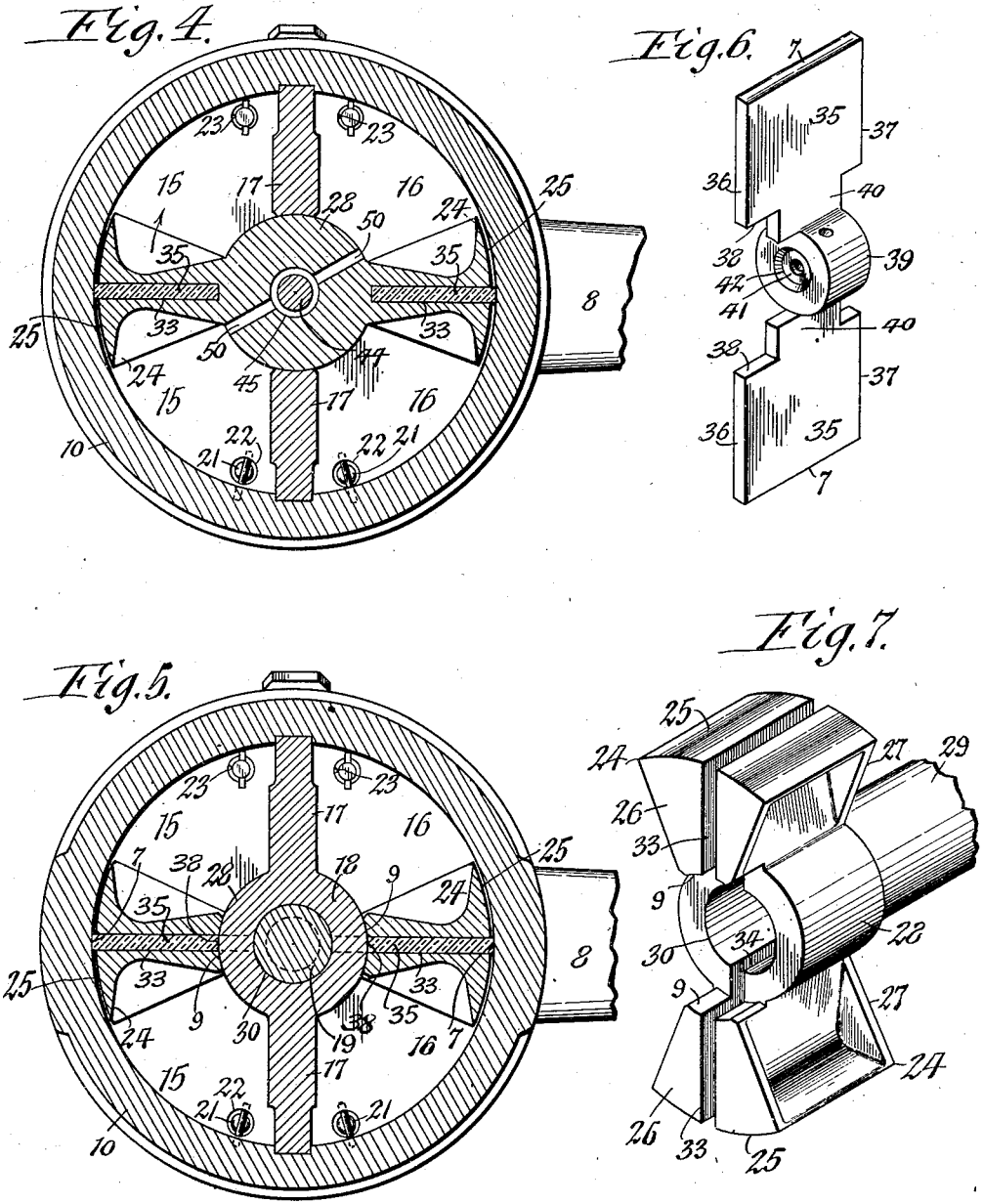

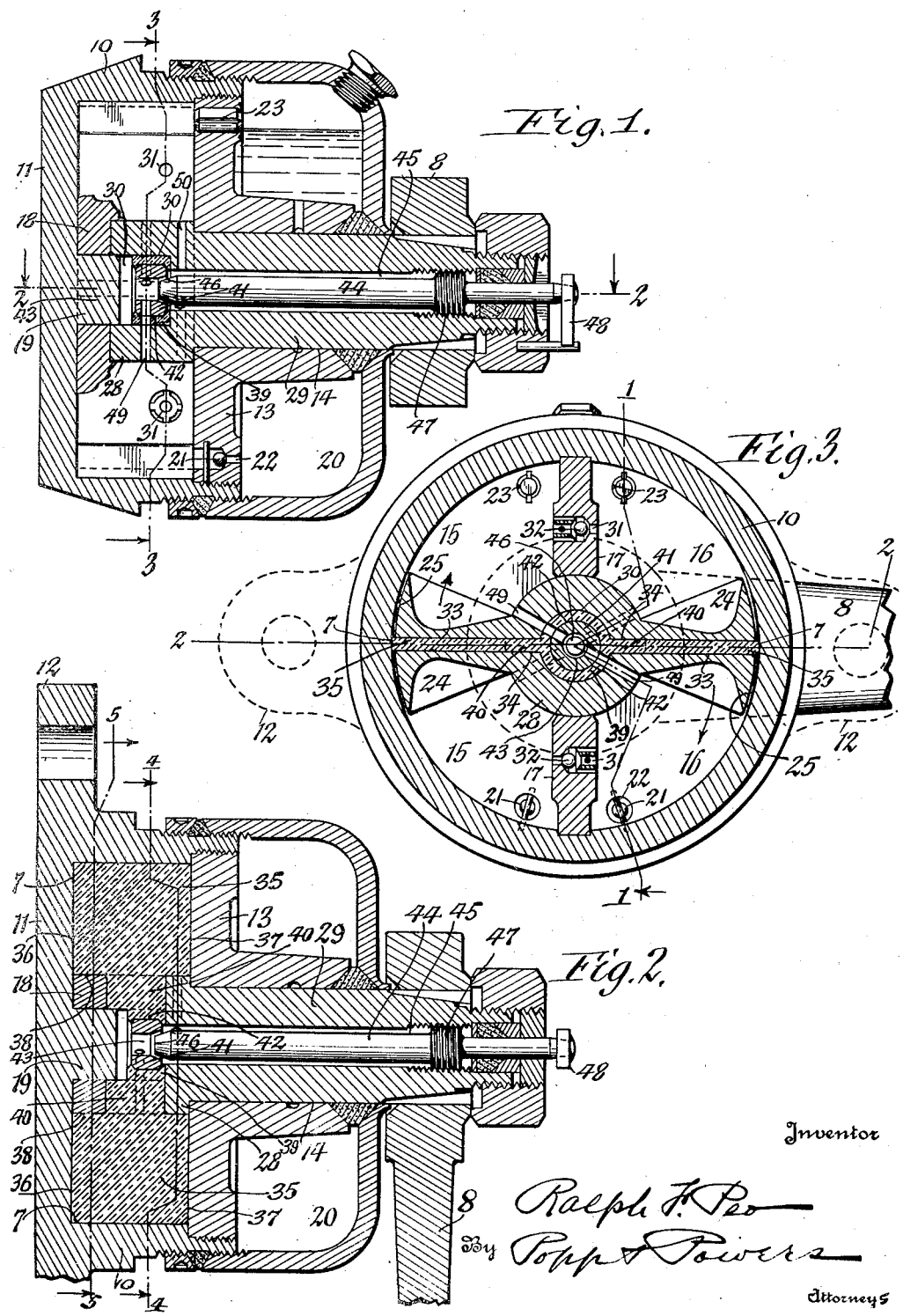

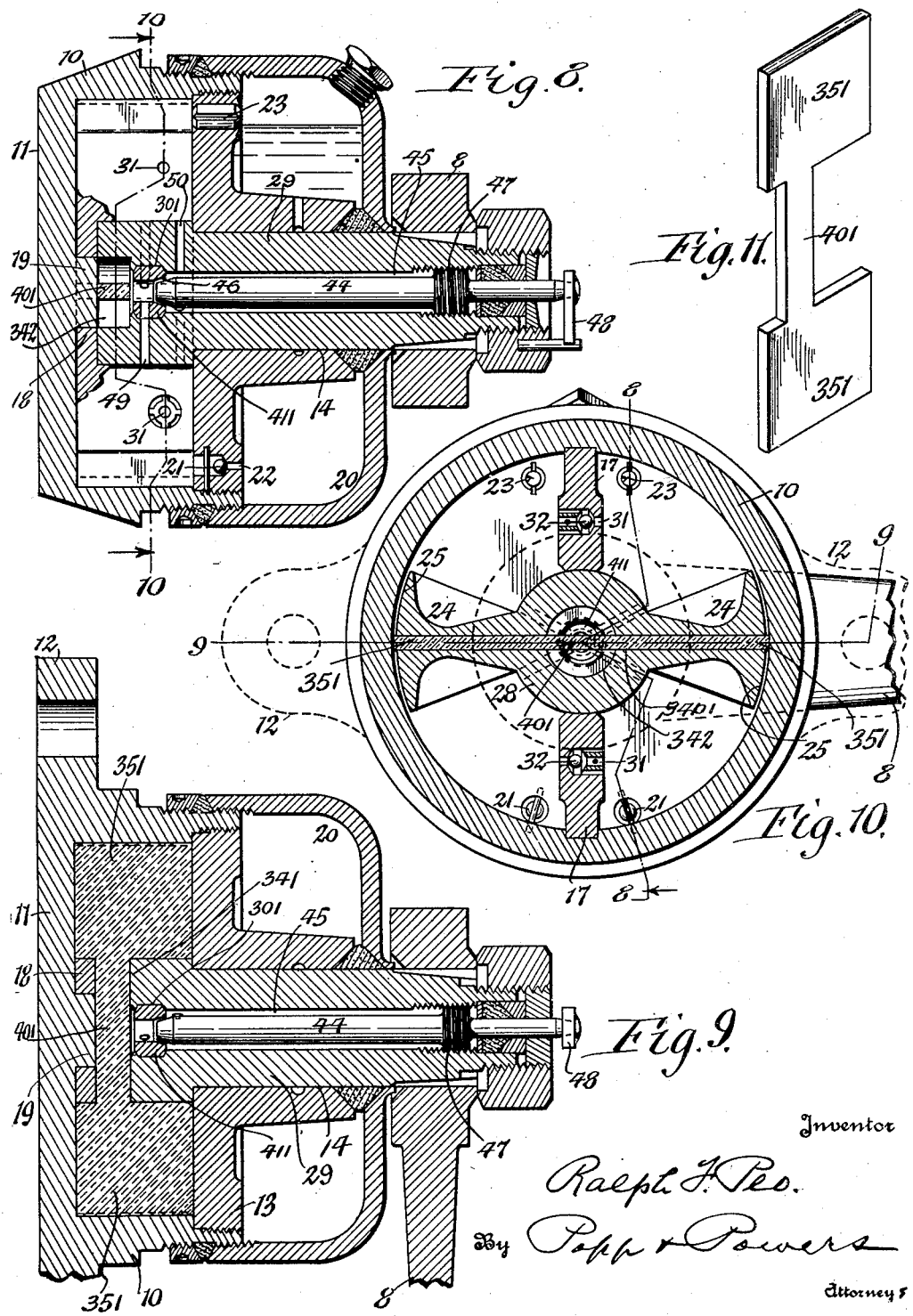

Patented Apr. 5, 1932

1,852,755

UNITED STATES PATENT OFFICE

RALPH F. PEO, OF KENMORE, NEW YORK, ASSIGNOR TO HOUDE ENGINEERING CORPORATION, OF BUFFALO, NEW YORK, A CORPORATION OF NEW YORK

SHOCK ABSORBER

Application filed March 7, 1930. Serial No. 433,940.

This invention relates to a hydraulic shock absorber for vehicles and other purposes and more particularly to absorbers of this type in which a resistance liquid is employed which is affected by temperature. It is well-known that oil and the like used in hydraulic shock absorbers becomes thicker or more viscous in cold weather and therefore flows slower, while in warm weather the oil becomes thinner or less viscous and flows faster, with the result that the operation of the shock absorber is irregular and works easy during summer time and hard in winter time.

It is the object of this invention to provide a hydraulic shock absorber which operates uniformly regardless of temperature conditions and to that end consist generally in providing the piston of the absorber on its surface with an insert having a different and preferably a greater rate of expansion and contraction under changes in temperature than the piston so that under increased temperature the insert will expand and fit the walls of the working chamber tightly and thereby cause an increase in the resistance to the movement of the piston in the working chamber, while under a decrease in temperature the insert will contract and produce a loose fit of the piston in the working chamber and thereby permit a certain amount of the liquid to slip or by-pass through the joint between the piston and the walls of the working chamber and reduce the resistance to the movement of the piston in the working chamber accordingly.

As a result an automatic compensation for temperature changes is effected thermostatically so that the shock absorber works uniformly regardless of variations in temperature.

In the accompanying drawings:

Figure 1 is a vertical longitudinal section of a shock absorber embodying one form of my invention, the section being taken on line 1—1, Fig. 3.

Figure 2 is a horizontal section taken on line 2—2, Fig. 3.

Figure 3 is a vertical transverse section taken on line 3—3, Fig. 1.

Figures 4 and 5 are vertical transverse sections taken on the correspondingly numbered lines in Fig. 2.

Figures 6 and 7 are perspective views of the thermostatic insert and the piston of the absorber.

Figure 8 is a vertical longitudinal section taken on line 8—8, Fig. 10 showing another form of my invention.

Figure 9 is a horizontal section taken on line 9—9, Fig. 10.

Figure 10 is a vertical transverse section taken on line 10—10, Fig. 8.

Fig. 11 is a perspective view of the thermostatic insert employed in connection with the construction shown in Figs. 8, 9 and 10.

In the following description similar characters of reference indicate like parts in the several figures of the drawings.

Although this invention may be variously organized the same in the present case is shown in connection with a hydraulic shock absorber of the Houdaille type. The particular adaptation of the invention shown in Figs. 1–7 is constructed as follows:—

The body of the shock absorber comprises a peripheral wall 10, a transverse flat, rear head or wall 11 and two laterally projecting lugs 12 whereby the body is attached to the body or frame of an automobile. The front of the body is closed by a front flat transverse head or wall 13 connected with the peripheral wall and provided with a central forwardly projecting bearing 14. The space within the peripheral wall 10, rear wall 11 and front wall 13 is divided into two semi-cylindrical working chambers 15, 16 by a partition having two radial sections 17, 17 and a central collar 18 connecting the inner ends of the partition sections and receiving a forwardly projecting centering pin 19 on the rear wall.

The working chambers are filled with a resistance liquid such as oil and this is automatically supplied thereto from a replenishing chamber or reservoir 20 arranged in front of the working chambers through one or more check valves 21 arranged in replenishing ports, 22 connecting the lower end of the replenishing chamber with the lower ends of the working chambers.

Air is permitted to escape from the upper ends of the working chambers to the upper end of the replenishing chamber through one or more vent ports 23 in the upper part of the front head or wall 13.

Each of the working chambers contains an oscillating piston 24 having a peripheral face 25 traversing the peripheral wall of the respective working chamber but separated therefrom by slight intervening space, a rear side face 26, traversing the rear wall 11, a front side face 27 traversing the front wall or head 13, and an axial face 9 traversing the periphery of the partition collar 18. The inner ends of these pistons are connected by a cylindrical hub 28 arranged on the front end of a shaft 29 journaled in the bearing 14. At its front end the shaft is provided with a rock arm 8 which is adapted to be connected with the axle of the vehicle or other part movable relatively to the body or frame of the vehicle while riding over a road.

The hub of the pistons bears with its periphery against the inner end of the partition sections, its rear end against the front side of the partition collar 18, its front end bears against the rear side of the front head 13 and the same is provided with a central axial bore 30 the rear part of which receives the centering pin 19.

The resistance liquid is permitted to pass comparatively free from the low pressure ends of the working chambers to the high pressure ends of the same during low pressure strokes of the same through by-pass ports 31 in the partition sections, but during high pressure strokes of the pistons in the direction of the arrow in Figs. 3, 4 and 5 the flow of the resistance liquid in the reverse direction through these ports is prevented by check valves 32.

Means are provided whereby the resistance liquid can leak through the opposing surfaces of the pistons and the working chambers during low temperatures but such leakage is retarded or checked altogether during high temperatures, thereby compensating for the difference in viscosity or thickness of the resistance fluid under different temperature conditions, it being well known that oil commonly used as the resistance liquid flows more sluggishly in winter time and more freely during summer time when the oil becomes thinner.

With that end in view the peripheral front and rear faces 27, 26 and the axial faces 9 of the pistons are fitted comparatively close to the opposing surfaces of the working chambers but the outer ends 25 of the pistons are spaced a substantial distance from the peripheral wall of the working chambers, as shown in Figs. 3, 4 and 5.

Mounted on the pistons and the hub connecting the same is a thermostatic insert of material having a different rate of expansion and contraction from that of the pistons and hub under changes in temperature so that in cold weather or low temperature this insert will contract more than the pistons and permit some of the resistance liquid to leak through the opposing peripheral surfaces of the pistons and working chamber, but during warm weather or higher temperatures the insert expands relatively to the pistons and thereby closes the gaps between the opposing peripheral surfaces of the pistons and the working chambers so as to prevent or retard the flow of resistance liquid therebetween. The preferred construction of the shock absorber for accomplishing this purpose is as follows:—

Each of the pistons is provided with a radial longitudinal slot 33 which extends through the curved peripheral side and the flat axial or side faces 26 of the same, and the hub is provided with radial longitudinal recesses 34 which are shorter than the slots 33 and connect the inner ends of the latter with the bore 30 in the hub.

The insert in the present case comprises two outer wide plates 35 each arranged in one of the slots 33 and having a peripheral face 7 traversing the peripheral wall of the respective working chamber, and front side faces 36, 37 traversing the rear and front walls of the same, and an axial face 38 traversing the collar 18 of the partition. Within the bore 30 is arranged a bushing 39 which is connected on diametrically opposite sides by narrow necks 40 with the inner ends of the plates 35 and arranged in the recesses 34 of the hub. The plates, necks and bushing of the insert are preferably made in one piece and of a metal differing in expansibility and contractibility from that of the pistons and working chambers under changing temperature. For example, the pistons and the walls and partition of the working chamber may be constructed of cast iron or steel and the insert may be constructed of copper or aluminum having a higher rate of expansion than the ferrous metal.

This insert therefore acts as an automatic valve or bleeder and compensates for any changes in the thickness of the resistance liquid due to temperature changes and causes the shock absorber to always work uniformly, inasmuch as the insert expands more in warm weather so as to prevent by-passing of resistance liquid between the pistons and the walls of the working chambers, and contracts more in cold weather so as to permit by-passing of the resistance liquid between the pistons and working chambers during cold weather.

Adjustment of the absorber to suit different loads may be effected in various ways, for instance this may be done by means which comprise a valve sleeve 41 arranged in a socket 42 in the bushing of the thermostatic insert and having a longitudinal regulating port 43, a valve stem 44 arranged lengthwise in a bore 45 of the piston hub and shaft and provided at its inner or rear end with a valve 46 for controlling said regulating port, a screw joint 47 adjustably connecting said valve stem with the rock shaft, a handle 48 arranged at the front end of the valve stem, and regulating passages 49 and 50 connecting opposite ends of said regulating port with opposite ends of said working chambers. By moving the regulating valve 46 toward and from the port 43 the flow of resistance liquid back and forth between the opposite ends of the working chambers may be regulated to suit the requirements of the particular vehicle, automobile or other place where the same may be installed.

If desired, the bushing 39 may be omitted in which case a valve sleeve 411 is employed which is secured directly in an axial opening 301 in the hub of the pistons and the outer wide plates 351 of the thermostatic insert are connected by an intermediate neck 401, as shown in Figs. 9, 10, and 11, which extends diametrically through a slot 341 and a recess 342 at the rear end of the piston hub, as shown in Figs. 9 and 10.

I claim as my invention:—

1. A hydraulic shock absorber having a chamber member adapted to contain a resistance liquid; a piston member arranged within said chamber, said members being movable one relatively to the other; and a thermostatic insert mounted on one of said members and to traverse the other member and having a different rate of expansion and contraction, and operating to produce either a tight or loose fit between the chamber and piston and to prevent or permit the passage of resistance liquid between the chamber and piston upon relative movement of the same under different temperatures.

2. A hydraulic shock absorber comprising a working chamber adapted to contain a resistance liquid; a piston movable back and forth in said chamber; and a thermostatic insert arranged in said piston and adapted to traverse a wall of said chamber and having a different rate of expansion and contraction from said piston so as to vary the spacing between said insert and said wall in accordance with the variations in temperature.

3. A hydraulic shock absorber comprising a working chamber adapted to contain a resistance liquid; a piston movable back and forth in said chamber and provided with a recess opening toward a wall of said chamber; and a thermostatic insert arranged in said recess and adapted to traverse said wall and having a different rate of expansion and contraction from said piston so as to vary the spacing between said insert and said wall in accordance with the variations in temperature.

4. A hydraulic shock absorber comprising a working chamber adapted to contain a resistance liquid and having a curved peripheral wall and two flat side walls; a piston adapted to rock in said chamber and having an outer face traversing the peripheral wall of said chamber and two side faces traversing the side walls of said chamber; said piston having a recess opening through the outer and side faces of the same; and a thermostatic insert arranged in said recess and having an outer face adapted to traverse the peripheral wall of said chamber and two side faces traversing the flat side walls of said chamber and constructed of a material having a different rate of expansion and contraction under temperature changes so as to vary the spacing between said insert and said wall in accordance with the variations in temperature.

5. A hydraulic shock absorber comprising a cylindrical body, a partition having sections dividing said body into two semi-cylindrical working chambers each of which has a peripheral wall and two flat side walls arranged at right angles to the axis of said peripheral wall and said working chambers adapted to contain a resistance liquid; two pistons each oscillating in one of said chambers and having an outer face traversing the peripheral wall of the respective chamber and two side faces traversing the two side flat walls of the same; a hub connecting said pistons and rocking between said partition sections; each of said pistons having a radial recess opening through the outer end and opposite sides thereof and said hub having a central recess communicating on opposite sides with said radial recesses; and an insert comprising two radial plates each arranged in one of said radial recesses and traversing the peripheral and flat walls of the respective working chamber, and a central bushing connecting said plates and arranged in said central recess; said insert being constructed of a material having a different rate of expansion and contraction from said pistons and hub.

6. A hydraulic shock absorber comprising a cylindrical body, a partition having sections dividing said body into two semi-cylindrical working chambers each of which has a peripheral wall and two flat side walls arranged at right angles to the axis of said peripheral wall and said working chambers adapted to contain a resistance liquid; two pistons each oscillating in one of said chambers and having an outer face traversing the peripheral wall of the respective chamber and two side faces traversing the two side flat walls of the same; a hub connecting said pistons and rocking between said partition sections; each of said pistons having a radial recess opening through the outer end and opposite sides thereof and said hub having a central recess communicating on opposite sides with said radial recesses; an insert comprising two radial plates each arranged in one of said radial recesses and traversing the peripheral and flat walls of the respective working chamber, and a central bushing connecting said plates and arranged in said central recess; said insert being constructed of a material having a different rate of expansion and contraction than said pistons and hub, and said hub and head being provided with by-passes which connect the opposite ends of both chambers with one another; and valve means for regulating the capacity of said passages.

7. A hydraulic shock absorber comprising a cylindrical body, a partition having sections dividing said body into two semi-cylindrical working chambers each of which has a peripheral wall and two flat side walls arranged at right angles to the axis of said peripheral wall and said working chambers adapted to contain a resistance liquid; two pistons each oscillating in one of said chambers and having an outer face traversing the peripheral wall of the respective chamber and two side faces traversing the two side flat walls of the same; a hub connecting said pistons and rocking between said partition sections; each of said pistons having a radial recess opening through the outer end and opposite sides thereof and said hub having a central recess communicating on opposite sides with said radial recesses; an insert comprising two radial plates each arranged in one of said radial recesses and traversing the peripheral and flat walls of the respective working chamber, and a central bushing connecting said plates and arranged in said central recess; said insert being constructed of a material having a different rate of expansion and contraction from said pistons and hub, and said hub and head being provided with by-passes which connect the opposite ends of both chambers with one another, and which lead to a valve port; a rock shaft journaled on said body and connected with said hub; and a valve stem adjustably mounted within said shaft and having a valve controlling said port.

In testimony whereof, I hereby affix my signature.

RALPH F. PEO.